United States Patent
Travis et al.

(10) Patent No.: US 12,206,637 B2
(45) Date of Patent: Jan. 21, 2025

(54) DISTRIBUTED EMAIL THREADING

(71) Applicant: Everlaw, Inc., Oakland, CA (US)

(72) Inventors: Zachary Travis, Oakland, CA (US);
Mark Sales, Castro Valley, CA (US)

(73) Assignee: Everlaw, Inc., Oakland, CA (US)

( * ) Notice: Subject to any disclaimer, the term of this patent is extended or adjusted under 35 U.S.C. 154(b) by 0 days.

(21) Appl. No.: 18/161,233

(22) Filed: Jan. 30, 2023

(65) Prior Publication Data
US 2024/0259336 A1    Aug. 1, 2024

(51) Int. Cl.
*H04L 51/216* (2022.01)
*H04L 51/42* (2022.01)

(52) U.S. Cl.
CPC ............ *H04L 51/216* (2022.05); *H04L 51/42* (2022.05)

(58) Field of Classification Search
CPC .............................. H04L 51/216; H04L 51/42
See application file for complete search history.

(56) References Cited

U.S. PATENT DOCUMENTS

| | | | |
|---|---|---|---|
| 10,050,919 B2 * | 8/2018 | Salpe | G06F 16/24 |
| 2012/0011448 A1 * | 1/2012 | Tse | G06Q 10/107 715/752 |
| 2013/0318172 A1 * | 11/2013 | Liberty | G06Q 10/107 709/206 |
| 2015/0263995 A1 | 9/2015 | Mahood et al. | |
| 2016/0283069 A1 * | 9/2016 | Gupta | G06Q 10/10 |
| 2018/0039893 A1 | 2/2018 | Bastide et al. | |
| 2019/0158520 A1 | 5/2019 | DiValentin et al. | |

OTHER PUBLICATIONS

May 13, 2024—(WO) International Search Report and Written Opinion—App PCT/US2024/011975.

\* cited by examiner

*Primary Examiner* — Cheikh T Ndiaye
(74) *Attorney, Agent, or Firm* — Banner & Witcoff, Ltd.

(57) ABSTRACT

Distributed email threading is disclosed. Emails are grouped into smaller related groups, as opposed to one large group, so that the groups are processed serially or in parallel to save processing power and time. Each email message group is handled in an independent job, which is distributable among any number of servers. A bipartite graph of email messages and message identifiers (such as subject line, recipient address, etc.) is created and used to determine connected sub-groups within the graph and, ultimately, which messages are connected to each other as part of an email thread. The sub-groups are processed independently for efficiency.

16 Claims, 9 Drawing Sheets

```
MIME-Version: 1.0
From: User1 <user1@email.com>
Date: Fri, 12 Nov 2021 14:28:00 -0800
Message-ID: <CAHS0n3ePzUUIhWr 059vnn-C5gAxp7n7y-T5XfWegbwSe1+40@mail.mail.com>
Subject: [Monthly Updates] Marketing - October 2021
To: Firm team <team@firm.com>
Content-Type: per orci nulla cras inceptos sociosqu interdum
X-Original -Sender: user1@email.com
X-Original -Authentication-Results: mx.browser.com;
    dkim=pass header.i=email.com header.s=browser header .b=j7069Vy;
    spf=pass (browser.com: domain of user1@email.com designates 209.85.220.41 as permitted sender) smtp.mail from=user1@email.c-
    dmarc=pass (p=NONE sp=NONE dis=NONE) header. from=email.com
Precedence: list
Mailing-list: list internal@web.com; contact internal+owners@email.com
List-ID: <internal.web.com>
X-Spam-Checked-In-Group: internal@web.com
X-Browser-Group-Id: 3087258504205
List-Post: <https://groups.browser.com/a/mail.com/group/internal/post>, mailto:internal@mail.com>
List-help: <https://support.browser. com/a/email.com/a/mail.com/bin/topic.py?topic=25838>, <mailto:internal+help@mail.com>
List-Archive: <https://groups.browser.com/a/mail.com/group/internal/>
List-Unsubscribe: <mailto:browsergroups-manage+4957168520S+unsubscribedbrowsergroups.com>, <https://groups.browser.com/a/mail.com -- 00900000000091fce05d09efe08
Content-Type: text/plain; charset="UTF-8"
Content-Transfer-Encoding: quoted-printable
```

FIG. 1A

Hi team,

Please see Marketing's updates for October below:

Stats & Highlights:

The full Marketing stats deck is available here
<https://docs.browser.com/presentation/d/1HwoyMDDWLwdsFb3jhehLfv17mTfONW4biq=AUvTBpHQ/edit#slide=3Did.gflea2f3bfe_0_0>
October highlights:

76 new Marketing sourced 10% opportunities in October, bringing us to 10=
0%
of our Q3 target. Despite a slow month in September, we made up ground
in October thanks to an increase in inbound activity, our updated conten=
t
syndication program, and the continued success of the SDR Lunch incentiv=
e
program, in which a prospect receives a lunch gift card in exchange for =
a
meeting. This is the second highest month all-time in terms of Marketing
10% activity, following February 2020, which was driven by opportunities
generated by Company XY, one of the major conferences we attend.

Storybuilder Campaign: In October we ended the quarter at 52% of our
goal. Throughout the quarter, we made updates to the landing page ← Body 110

FIG. 1A (Continued)

Original Message

| | |
|---|---|
| Message ID | <ABCdefg123hij456_klm789@mail.emailcom> |
| Created at: | Fri, Nov 12, 2021 at 2:28 PM (Delivered after 110 seconds) |
| From: | User 1 <user1@email.com> |
| To: | Firm team <team@firm.com> |
| Subject: | [Monthly Updates] Marketing - October 2021  Learn More |
| SPF: | PASS with IP 123.45.678.90  Learn More |
| DKIM: | 'PASS' with domain web.com  Learn More |
| DMARC: | 'PASS'  Learn More |

Header 150

Message Identifier 152

Message - ID    1/6  < >

Message Sender 156

Message Recipient 158

Message Subject 154

Download Original    Copy to Clipboard

Metadata 162

```
Delivered-To: user2@firm.com
Received: by 2002: a2e:a912:0:0:0:0:0 with SMTP id j18csp2633475tjq:
    Fri, 12 Nov 2021 14:29:50 -0800 (PST)
X-Received: by 2002: a1c: 3546:: with SMTP id c67mr20647005wma.43.1636761690818;
    Fri, 12 Nov 2021 14:29:50 -0800 (PST)
ARC- Seal; i=3; a=rsa-sha256;    t=1636756190;   cv=pass;
    d=browser.com;  s=arc-20160816;
    b=Tk+Ak5JzAUk8a7pQJbypqG6t452qXRVIa46VLPKhyCR9NgIjYE6POiUk/80KZws+Cu
    Eev7gcJaIKAliroBHmUaITcUt4HuBzH7tFLk3vM1vAxANSbz2iVxogbaZ1strthe13
    PIFA8E9kqFSKKHK81bMtsyqB01BOM6c9+ng6ah2mAmAKFzEzBwITmNxiON9usFg+n/U
    tqTU8/NhXIaaIx6JgqdsEDJPyseUzJbNeWkikSGOQbcLVGUMfSLjSFPXtGoVRs+7a2Jjk
    Rp9Ptyg2+FES+wstf16ttps2s059TWzr3AXmvijunKgdoZGRe1MK/TSNH81Zt+7SxxU
    /2mQ==
```

Metadata 162

DISTRIBUTED EMAIL THREADING

FIELD OF THE DISCLOSURE

The present disclosure relates to methods, computing systems, and storage media for distributed email threading and threading of other documents and communications.

BACKGROUND

In the context of legal proceedings, for example, document review (or "doc" review) describes a process by which a party to a case analyzes documents in their possession (e.g., possessed before the case or obtained through discovery) to determine which documents are relevant to the case or otherwise sensitive (e.g., privileged). Document review is often performed by attorneys for their clients. In many cases, email messages make up a large fraction (e.g., one-half or two-thirds) of the documents under review. Email messages representative of relevant reply threads are ultimately used as evidence in many cases.

Email threading is one technique used to help organize related email messages from different sources (e.g., senders or recipients) into coherent conversations based on message relationships, such as common threads of emails, people involved in an email conversation, duplicate emails, email attachments, and the like. Generally, email threading involves gathering all forwards, replies, and reply-all messages of an email conversation together to identify message relationships. A given email thread starts with an original email and includes subsequent related reply and forward emails. Documents containing the emails being threaded are segmented into individual or component email messages. Because an entire or partial thread is often appended to new replies or forwards, there is a potential for large numbers of duplicate emails. Nevertheless, each email must be analyzed during email threading.

With conventional email threading, each pair of email messages must be compared within a set of email messages under review. In other words, each email message must be compared with every other individual email message in the set, for example, to determine if they are part of the same email thread. The computational cost of such comparisons increases quadratically as the number of email messages in the set increases linearly. For example, a set of 10 email messages requires 100 comparisons to be processed, a set of 100 email messages requires 10,000 comparisons, a set of 10,000 email messages requires 100,000,000 comparisons, a set of 1,000,000 email messages requires 1,000,000,000,000 comparisons, etc.

Document reviews in legal proceedings are growing in average size each year and often have many millions of documents to process. In typical conventional email threading approaches, the set of email messages cannot be broken into smaller subsets because of the requirement that each email message needs to be compared to every other email message in the full set. That is, a subset would not necessarily contain all of the related email messages that need to be compared with each of its constituent email messages. Because different subsets of email messages cannot be processed separately or in parallel in conventional document processing for email threading, computing costs and storage needs increase quadratically relative to the number of email messages in a set. This routinely takes multiple days to complete in conventional systems, which is regularly problematic in deadline-driven litigation.

SUMMARY

One aspect of the present disclosure relates to a method in a data processing system for distributed email threading. The method includes receiving a set of email messages. The method includes extracting identifiers from each email message in the set of email messages. The method includes determining a graph of connections between the identifiers and each email message in the set of email messages, a given connection between a first email message and a first identifier conveying that the first email message includes the first identifier. The method includes determining groups of email messages from among the set of email messages based on the graph, a given group having email messages that belong to the same email conversation. Each email in the given group shares at least one identifier with at least one other email message in the given group. The method further includes performing, by the processor, email threading on one or more individual ones of the groups of email messages, and processing two or more of the threaded groups of email messages independently of each other.

Another aspect of the present disclosure relates to a computing system configured for distributed email threading. The computing system includes a memory having executable instructions. The computing system includes one or more hardware processors configured to execute the instructions. The processor(s) executes the instructions to receive a set of email messages. The processor(s) executes the instructions to extract identifiers from each email message in the set of email messages. The processor(s) executes the instructions to determine a graph of connections between the identifiers and each email message in the set of email messages, a given connection between a first email message and a first identifier conveying that the first email message includes the first identifier. The processor(s) executes the instructions to determine groups of email messages from among the set of email messages based on the graph, a given group having email messages that belong to a same email conversation. Each email in the given group shares at least one identifier with at least one other email message in the given group. The processor(s) executes the instructions to perform email threading on individual ones of the groups of email messages, and processes two or more of the threaded groups of email messages independently of each other.

BRIEF DESCRIPTION OF THE DRAWINGS

FIG. 1A illustrates an example email message, in accordance with one or more implementations.

FIG. 1B illustrates an example email header, in accordance with one or more implementations.

DETAILED DESCRIPTION

Figure 1C:
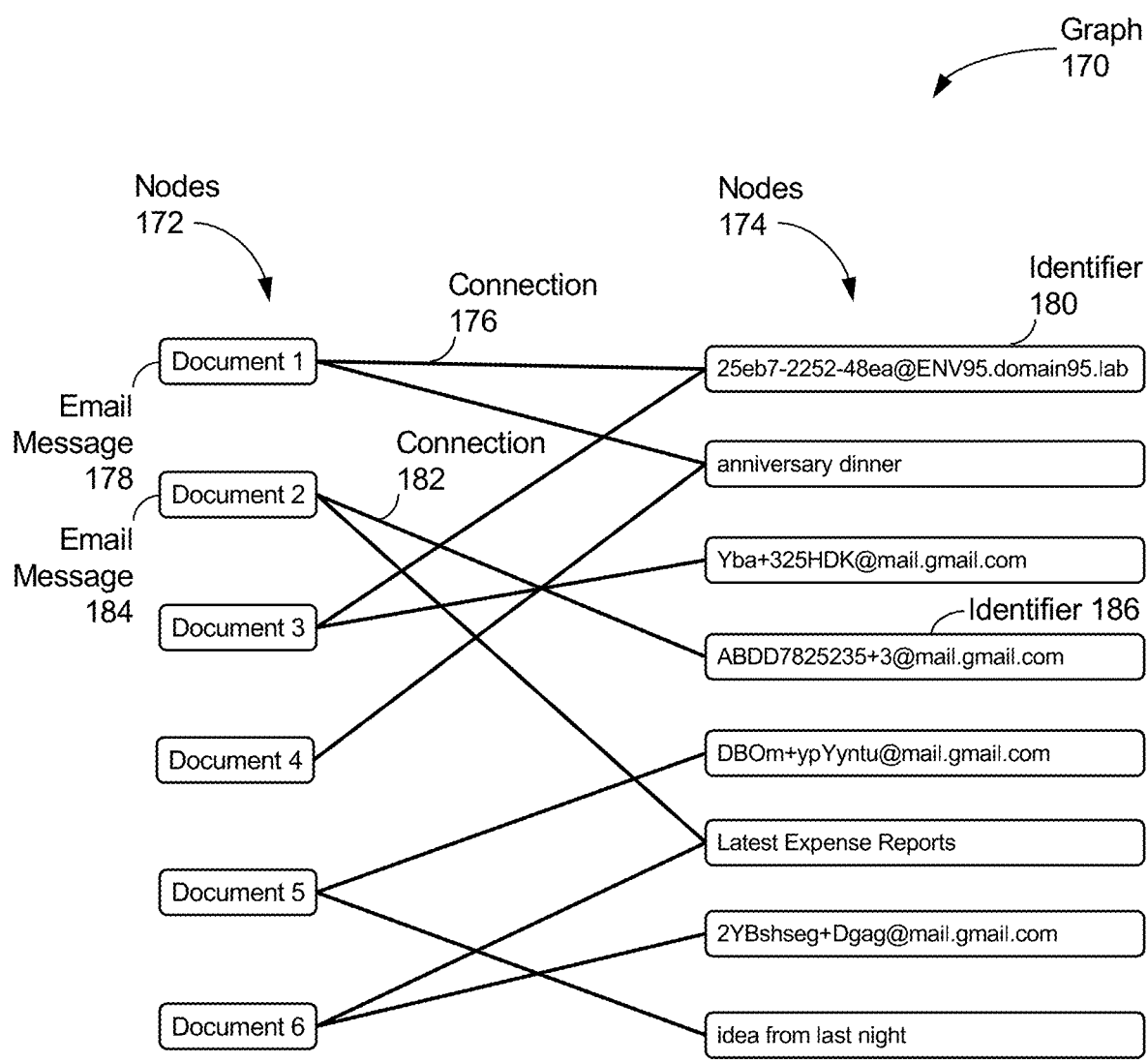
FIG. 1C illustrates an example bipartite graph of connections between email messages and identifiers, in accordance with one or more implementations.

Implementations described herein provide for distributed email threading by grouping emails in smaller related groups, as opposed to one large group, so that the groups are separately processable, possibly in parallel, or serially one at a time, a combination of serially and parallel, or some not at all, to save processing power and time. Each email message group is handled in an independent job, which is distributed among any number of servers, according to some implementations. This saves the processing time and taxation on resources of processing one large group and speeds up document comparison for email threading. This is also applicable to other documents and communications such as chat data, text messages, or other documents which represent communications or otherwise.

In some implementations, the system extracts a handful of identifiers from each email in the document set. For example, identifiers for email messages include one or more of a message subject, a message identifier (message ID), reply-to identifiers (reply-to IDs), or other identifiers within each email message. If a given email message has embedded replies, the system extracts the same identifiers from the replies from the text (e.g., of the message body). The system uses a table of identifiers and the email messages from which they were extracted to create a bidirectional bipartite map between email messages and identifiers. All email messages which share any identifier are transitively merged into the same "group" of email messages, whereas they will be from the same email thread. In one implementation, these groups contain all of the email messages with the potential to be in the same reply chain as one another. That is, the email messages in each group are identified as email duplicates or email replies of one another, looking only at the emails within the same group. Each group is threaded in an independent job. Once bundled into independent smaller jobs, the system distributes them among different servers, processes them in parallel, serially, or a combination of both, or eliminates some jobs from processing.

The disclosed system(s) and method(s) save significant computing resources, such as processing power and memory usage by cutting down on the number of document pair comparisons for large sets of documents such as email messages. The individual pair-by-pair comparison of a large set of documents for conventional email threading takes significantly more computing resources and processing power due to the inefficient comparison process in contrast to methods and systems disclosed herein. These systems also solve the technical problem associated with determining groups of related email messages among a set of email documents in a way that scales to accommodate large sets (e.g., thousands or even millions of email messages) while maintaining the ability to compare, in one implementation, all relevant email message pairs. The sum of the pair-by-pair comparisons of these document groups is far less than the number of pair-by-pair comparisons required if using conventional processing for the entire document set. For example, a set of 100 documents, if conventionally processed together, would require 10,000 comparisons, whereas those same 100 documents divided into four groups of 10, 20, 30, and 40 documents would only require 3,000 comparisons (i.e., 100+400+900+1600). Computational savings increase (e.g., exponentially) as the total document sets and sizes increase or as the number of groups per document set increases. In addition to reducing the total number of document comparisons, the disclosed system(s) and method(s) facilitate efficiency-gaining techniques not possible in conventional email threading such as, for example, parallel processing different groups of documents on different processors or servers, choosing not to process certain groups, processing different groups based on different document relationships, and other techniques. As such, the disclosed subject technology provides improvements to the functioning of the computer itself because it improves processing and efficiency in email threading of sets of documents thereby affecting processor and memory usage.

FIG. 1A illustrates an example email message with a header 100, in accordance with one or more implementations. The header 100 includes one or more fields. Examples of such fields include one or more of a message identifier 102, a message subject 104, a message sender 106 (e.g., name or email address), a message recipient 108 (e.g., name or email address), or other fields. The message identifier 102 includes a unique number or alphanumeric code associated with a specific email. The message subject 104 includes a description of the email message that is viewable without accessing other contents of the email message, according to some implementations. The message sender 106 identifies an individual who originated the email message. The message recipient 108 identifies one or more individuals to whom the email message was sent. In addition to the header 100, the email message illustrated in FIG. 1A includes a body 110. The body 110 includes the contents of the email message (e.g., text, images, or other content). In some implementations, metadata 112 is associated with the email message.

FIG. 1B illustrates an example header 150, in accordance with one or more implementations. FIG. 1B shows a different format from FIG. 1A that an email header 150 may be received in. Various formats include MIME-encoded text files, screen shots of emails or a PDFs of emails. The header 150 includes one or more fields related to email messages. Examples of such fields include, without limitation, a message identifier 152, a message subject 154, a message sender name or email address 156, a message recipient name or email address 158, or other fields. The header 150 includes or links to metadata 162 associated with the underlying email message or thread. Metadata 162 includes additional information about the email, such as, for example, time of sending, time of receipt, or other relevant information.

FIG. 1C illustrates an example graph 170 of connections between email messages and identifiers, in accordance with one or more implementations. In one implementation, the graph 170 is a bipartite graph. The bipartite graph has a set of graph vertices decomposed into two disjoint sets. Graph vertices in the same disjoint set are nonadjacent. In other words, no two graph vertices within the same disjoint set are adjacent. The components on the left side of the graph connect with components on the right side of the graph directly only, and do not connect directly with each other. Similarly, components on the right side of the graph connect with components on the left side of the graph directly only, and do not connect directly with each other. Although shown as a graph, the graph can be represented in a computer as a mapping. In one implementation, each component of the graph contains a collection of references to the other components it is linked to. The references are embodied as addresses in the RAM to where the referenced component is stored.

The graph 170 includes a first set of nodes 172 corresponding to email messages from the set of email messages. The graph 170 includes a second set of nodes 174 corresponding to the identifiers (e.g., message identifier 102, a message subject 104, a message sender 106, a message recipient 108, etc.) from email messages in the set of email messages. Connections between email messages and individual identifiers indicate whether specific email messages include specific identifiers. For example, a connection 176 between an email message 178 and an identifier 180 conveys that the email message 178 includes the identifier 180. A connection 182 between an email message 184 and an identifier 186 conveys that the email message 184 includes the identifier 186.

Figure 1D:
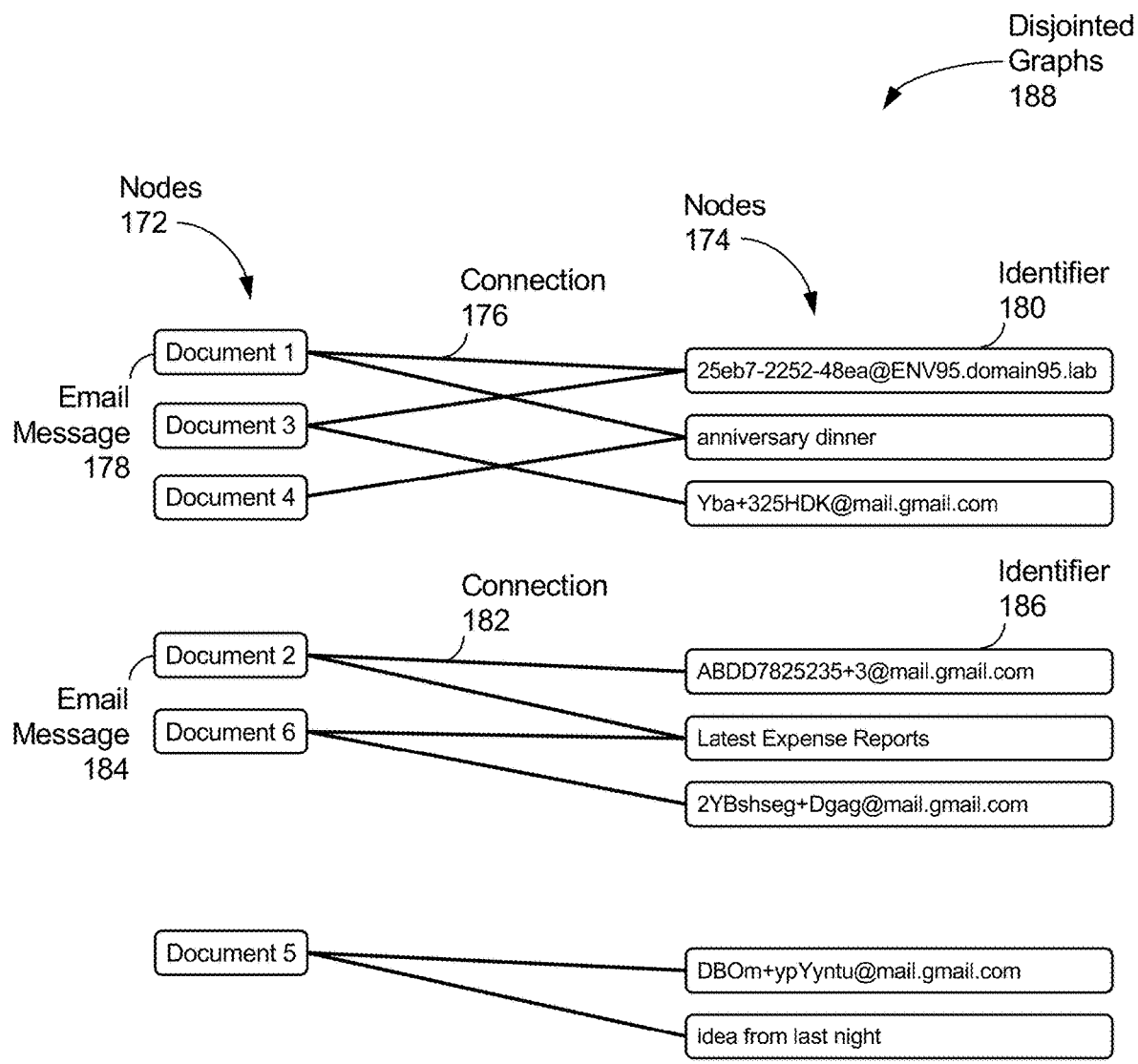
FIG. 1D illustrates example disjointed graphs determined based on connections to identifiers, in accordance with one or more implementations.

FIG. 1D illustrates example disjointed graphs 188 determined based on connections to identifiers, in accordance with one or more implementations. Each one of the disjointed graphs 188 represents a group of related email messages. For example, a given group includes email messages that belong to the same email conversation. In some implementations, the groups of email messages are determined based on one or both of a Shiloach-Vishkin variation or a random-mate algorithm. In some implementations, determining groups of email messages from among the set of email messages, based on the graph 170 (see FIG. 1C), includes identifying disjoint connected graphs within the bipartite graph. Each email in the given group shares at least one identifier with at least one other email message in the given group. For example, the group that includes the email message 178—such as documents 1, 3, and 4—includes at least one other email message that shares the identifier 180. The group that includes the email message 184 (i.e., documents 2 and 6) includes at least one other email message that shares the identifier 186. Document 5 is in a separate group with only one email in it.

Figure 1E:
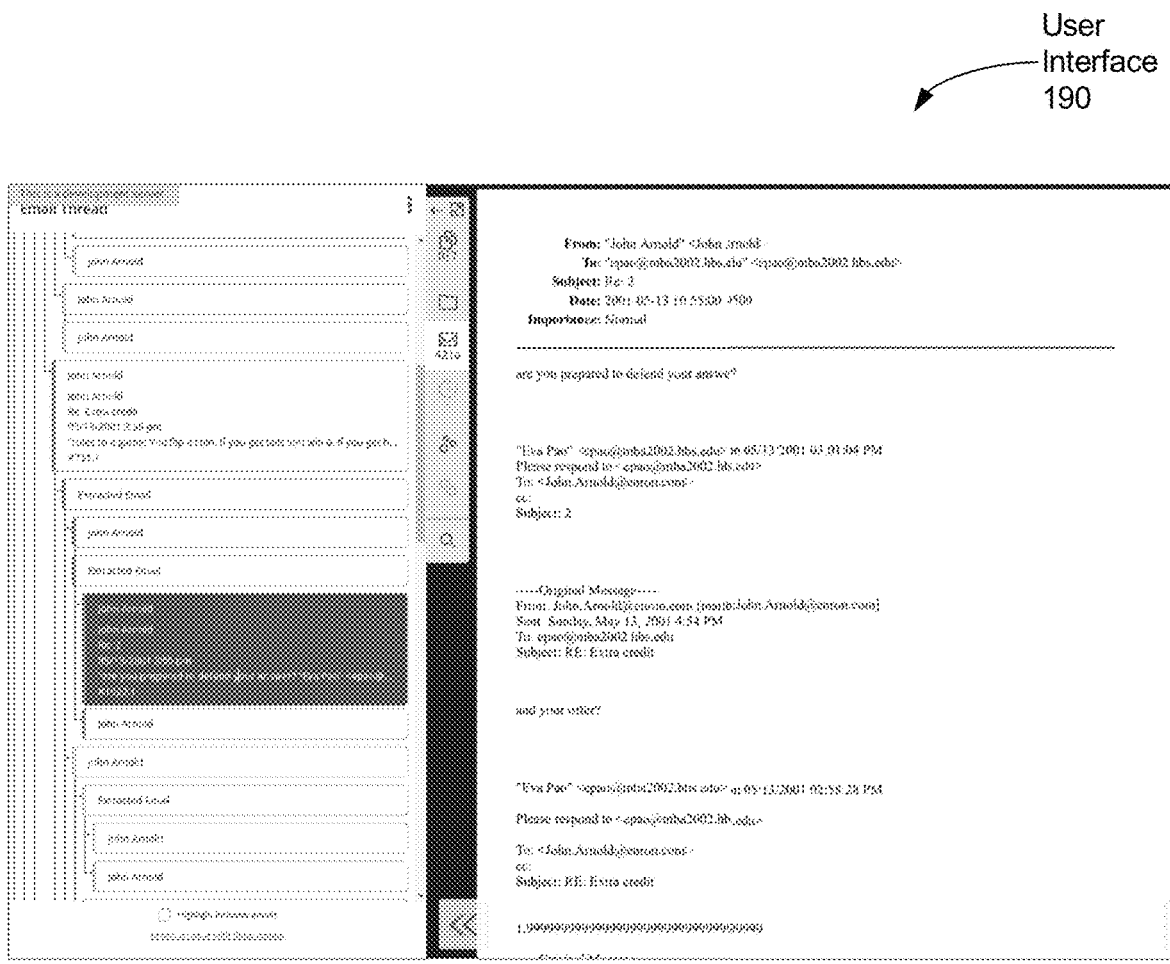
FIG. 1E illustrates an example user interface configured to facilitate review of threaded email messages, in accordance with one or more implementations.

FIG. 1E illustrates an example user interface 190 for reviewing threaded email messages, in accordance with one or more implementations. The user interface 190 is displayed through a client computing device and the grouping of email messages is performed by a server, virtual machine (VM), or other backend computing device, according to some implementations. In the user interface 190, one or more email conversations are displayed such that a given email conversation is displayed with email messages from the given email conversation in chronological order. The system displays the given email conversation lacking duplicate email messages. The flow of the given conversation is visually mapped across participants of the given conversation.

Figure 2:
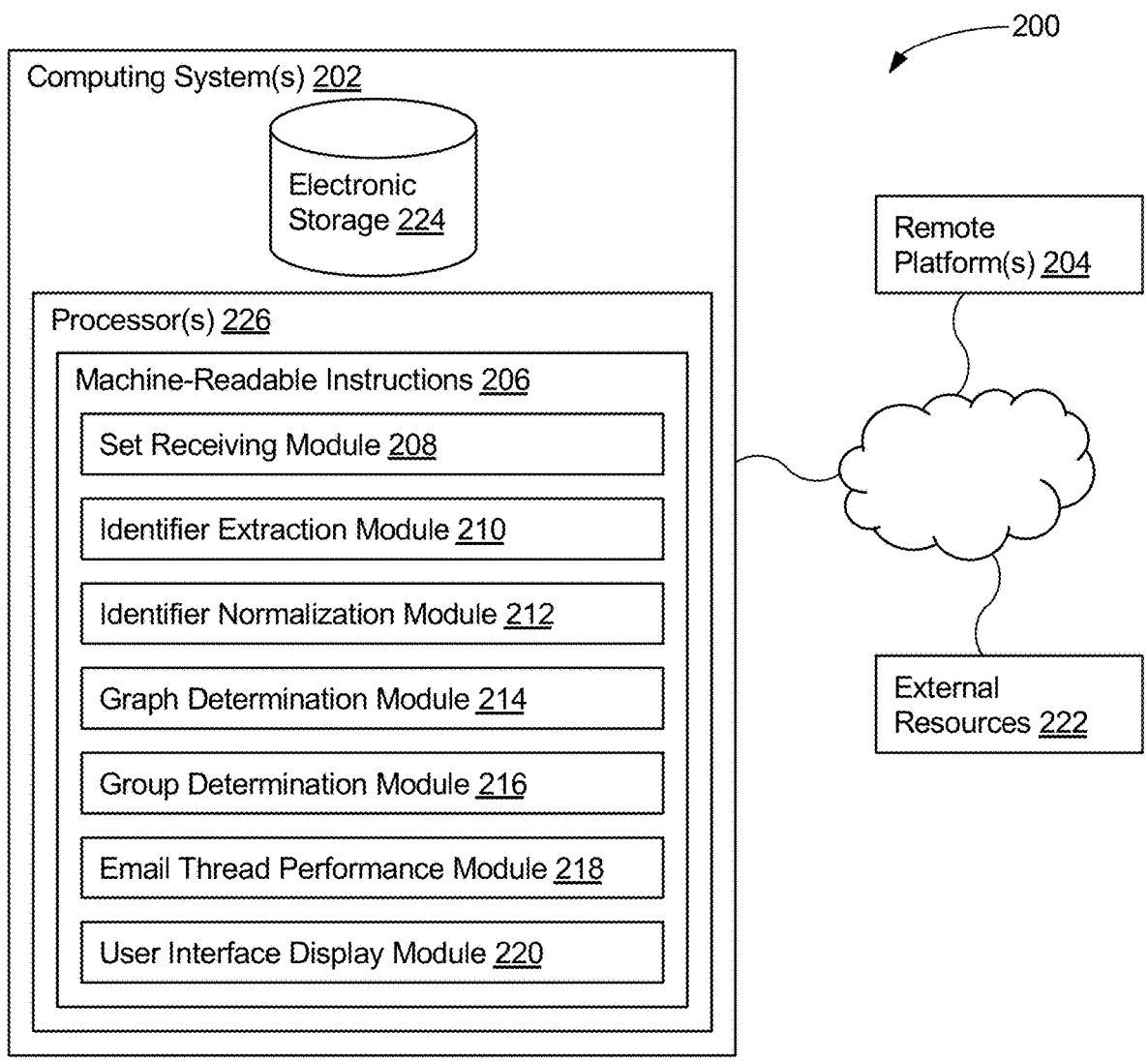
FIG. 2 illustrates a system configured for distributed email threading, in accordance with one or more implementations.

FIG. 2 illustrates a system 200 configured in a data processing system for distributed email threading, in accordance with one or more implementations. In some implementations, system 200 includes one or more computing systems 202. Computing system(s) 202 are configured to communicate with one or more remote platforms 204 according to a client/server architecture, a peer-to-peer architecture, or other architectures. Remote platform(s) 204 are configured to communicate with other remote platforms via computing system(s) 202 or according to a client/server architecture, a peer-to-peer architecture, or other architectures. In some implementations, users access system 200 through remote platform(s) 204.

Computing system(s) 202 are configured by machine-readable instructions 206. Machine-readable instructions 206 includes instruction modules. The instruction modules include computer program modules. The instruction modules include one or more of set receiving module 208, identifier extraction module 210, identifier normalization module 212, graph determination module 214, group determination module 216, email thread performance module 218, user interface display module 220, or other instruction modules.

Set receiving module 208 is configured to receive a set of email messages. The set of email messages includes many email messages (e.g., more than one million email messages). Some different email messages are unstructured or have a nonuniform format between the different email messages, according to one or more implementations.

Identifier extraction module 210 is configured to extract identifiers from each email message in the set of email messages. The identifiers are extracted from metadata or header information associated with email messages in the set of email messages.

The identifiers include one or more message header fields. For example, the one or more message header fields include one or more of message recipient's name or email address, message sender's name or email address, message subject, carbon copy email address, blind carbon copy email address, message content type, message precedence, message identifier, in-reply-to message identifier, references message identifier, reply-to email address, or message archived-at link. The message recipient's name or email address includes a name or email address associated with a person who received the email message from the message sender. The message sender's name or email address includes a name or email address associated with the person who sent the email to the message recipient. The message subject includes text describing the contents of or otherwise associated with the email message. The carbon copy email address includes an email address associated with a secondary message recipient. The carbon copy email is visible to the message sender and the message recipient. The blind carbon copy email address includes an email address associated with a secondary message recipient. The carbon copy email is visible to the message sender and invisible to the message recipient. The message content type includes information related to how the email message is to be displayed. The message indicator indicates whether automated responses should be returned to the message sender. The message identifier includes a unique code associated with the email message. The in-reply-to message identifier includes a message identifier of a previous email message that the email message is a reply to. The reference message identifier includes a message identifier of a previous email message that the email message is a reply to, a message identifier of an earlier email message that the previous message is a reply to, and so on. The reply-to email address includes an email address that should be used to reply to the email message. The message archived-at link includes a link to an archived form of the email message.

According to some implementations, at least a portion of the identifiers are merged. A transitive merge is used to merge the identifiers, according to some implementations. The at least a portion of the identifiers are merged into memory. The memory is random access memory (RAM), according to some implementations. In one implementation, the memory is of a single computing system. The system uses a disjoint set data structure to store the at least a portion of the identifiers.

Identifier normalization module 212 is configured to normalize the identifiers. In some implementations, normalizing a first identifier and a second identifier having different descriptions includes determining whether the different descriptions refer to a same type of identifier. For example, the first identifier and the second identifier are determined to be the same type of identifier when the first identifier and the second identifier are each described as sender, originator, approved, x-sender, originator-info, or x-envelope-from. For example, the first identifier and the second identifier are determined to be the same type of identifier when the first identifier and the second identifier are each described as to, for-handling, for-comment, for-approval, apparently-to, or x-envelope-to. For example, the first identifier and the second identifier are determined to be the same type of identifier when the first identifier and the second identifier are each described as reply-to, follow-up-to, errors-to, return-receipt-to, or content-return. In some implementations, normalizing the identifiers includes removing prefixes from message subject lines. The prefixes include one or more of RE, FWD, or other prefixes.

Graph determination module 214 is configured to determine a graph of connections between the identifiers (e.g., normalized identifiers) and each email message in the set of email messages, where a given connection between a first email message and a first identifier conveys that the first email message includes the first identifier. In some implementations, the graph is a bipartite graph. The bipartite graph includes a first set of nodes corresponding to email messages from the set of email messages. The bipartite graph includes a second set of nodes corresponding to the identifiers from email messages in the set of email messages. In some implementations, the bipartite graph is implemented as a mapping in memory or a database.

Group determination module 216 is configured to determine groups of (or group) email messages from among the set of email messages based on the graph, a given group having email messages that belong to the same email conversation. In some implementations, the groups of email messages are determined based on one or both of a Shiloach-Vishkin variation or a random-mate algorithm. In some implementations, determining groups of email messages from among the set of email messages based on the graph includes identifying disjoint connected graphs within a bipartite graph. Each email in the given group shares at least one identifier with at least one other email message in the given group. According to some implementations, the groups of the email messages are processed in parallel, serially, or a combination thereof.

Email thread performance module 218 is configured to perform email threading on individual ones of the groups of email messages. Performing email threading includes organizing email messages the set of email messages into related conversations based on message relationships. For example, the message relationships include one or more of common threads, people involved in a conversation, attachments, or duplicate emails.

User interface display module 220 is configured to cause display, through a user interface, of one or more email conversations determined based on the email threading of a given group of email addresses. In some implementations, the one or more email conversations are displayed such that a given email conversation is displayed with email messages from the given email conversation in chronological order. In some implementations, the given email conversation is displayed as lacking duplicate email messages. In some implementations, the flow of the given conversation is visually mapped across participants of the given conversation.

In some implementations, computing system(s) 202, remote platform(s) 204, or external resources 222 are operatively linked via one or more electronic communication links. For example, in some implementations, such electronic communication links are established, at least in part, via a network such as the Internet or other networks. It will be appreciated that this is not intended to be limiting. The scope of this disclosure includes implementations in which computing system(s) 202, remote platform(s) 204, or external resources 222 are operatively linked via some other communication media.

A given remote platform 204 includes one or more processors configured to execute computer program modules. The computer program modules are configured to enable an expert or user associated with the given remote platform 204 to interface with system 200 or external resources 222, or provide other functionality attributed herein to remote platform(s) 204. For example, a given remote platform 204 or a given computing system 202 includes one or more of a server, a desktop computer, a laptop computer, a handheld computer, a tablet computing system, a Smartphone, a gaming console, or other computing systems.

External resources 222 includes sources of information outside of system 200, external entities participating with system 200, or other resources. In some implementations, some or all of the functionality attributed herein to external resources 222 are provided by resources included in system 200.

Computing system(s) 202 includes electronic storage 224, one or more processors 226, or other components. Computing system(s) 202 includes communication lines, or ports to enable the exchange of information with a network or other computing platforms. The depiction of computing system(s) 202 in FIG. 2 is not intended to be limiting. Computing system(s) 202 includes a plurality of hardware, software, or firmware components operating together to provide the functionality attributed herein to computing system(s) 202. For example, computing system(s) 202 is implemented by a cloud of computing platforms operating together as computing system(s) 202, according to some implementations.

Electronic storage 224 includes non-transitory storage media or memory that electronically stores information. The electronic storage media of electronic storage 224 includes one or both of system storage that is provided integrally (i.e., substantially non-removable) with computing system(s) 202 or removable storage that is removably connectable to computing system(s) 202 via, for example, a port (e.g., a USB port, a firewire port, etc.) or a drive (e.g., a disk drive, etc.). Electronic storage 224 includes one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically readable storage media. Electronic storage 224 includes one or more virtual storage resources (e.g., cloud storage, a virtual private network, or other virtual storage resources). Electronic storage 224 stores software algorithms, information determined by processor(s) 226, information received from computing system(s) 202, information received from remote platform(s) 204, or other information that enables computing system(s) 202 to function as described herein.

Processor(s) 226 are configured to provide information processing capabilities in computing system(s) 202. As such, processor(s) 226 includes one or more of a digital processor, an analog processor, a digital circuit designed to process information, an analog circuit designed to process information, a state machine, or other mechanisms for electronically processing information. Although processor(s) 226 is shown in FIG. 2 as a single entity, this is for illustrative purposes only. In some implementations, processor(s) 226 includes a plurality of processing units. In some implementations, these processing units are physically located within the same device. Alternatively, processor(s) 226, in some implementations, are located in different devices but operate in coordination. Processor(s) 226 are configured to execute modules 208-220, or other modules. Processor(s) 226 are configured to execute modules 208, 210, 212, 214, 216, 218, or 220, or other modules by software; hardware; firmware; some combination of software, hardware, or firmware; or other mechanisms for configuring processing capabilities on processor(s) 226. As used herein, the term "module" refers to any component or set of components that perform the functionality attributed to the module. This includes one or more physical processors during execution of processor-readable instructions, the processor-readable instructions, circuitry, hardware, storage media, or any other components.

It should be appreciated that although modules 208, 210, 212, 214, 216, 218, or 220 are illustrated in FIG. 2 as being implemented within a single processing unit, in implementations in which processor(s) 226 includes multiple processing units, one or more of modules 208, 210, 212, 214, 216, 218, or 220 are implemented remotely from the other modules, according to some implementations. The description of the functionality provided by the different modules 208, 210, 212, 214, 216, 218, or 220 described below is for illustrative purposes and is not intended to be limiting, as any of modules 208, 210, 212, 214, 216, 218, or 220 provide more or less functionality than is described, according to some implementations. For example, one or more of modules 208, 210, 212, 214, 216, 218, or 220 are eliminated, and some or all of its functionality is provided by other ones of modules 208, 210, 212, 214, 216, 218, or 220, according to some implementations. As another example, processor(s) 226 are configured to execute one or more additional modules that perform some or all of the functionality attributed below to one of modules 208, 210, 212, 214, 216, 218, or 220, according to some implementations.

Figure 3:
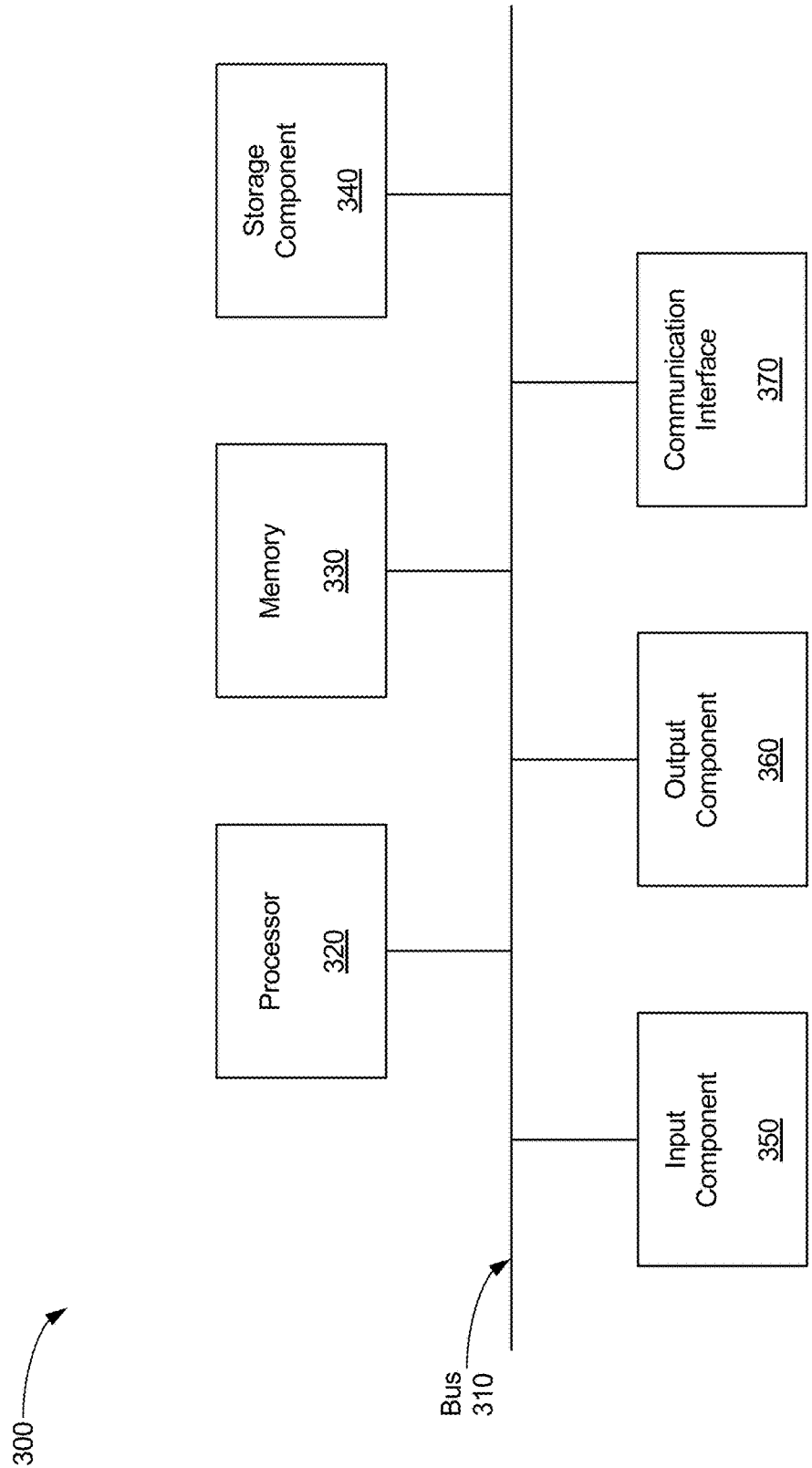
FIG. 3 illustrates an example computing device to implement the processes.

FIG. 3 is a diagram of example components of a device 300, which correspond to one or more of computing system(s) 202, remote platform(s) 204, or other device(s) described herein. In some implementations, computing system(s) 202, remote platform(s) 204, or other devices described herein include one or more devices 300 or one or more components of device 300. As shown in FIG. 3, device 300 includes a bus 310, a processor 320, a memory 330, an input component 340, an output component 350, and a communication component 360.

Bus 310 includes one or more components that enable wired or wireless communication among the components of device 300. Bus 310 couples together two or more components of FIG. 3, such as via operative coupling, communicative coupling, electronic coupling, or electric coupling. Processor 320 includes a central processing unit, a graphics processing unit, a microprocessor, a controller, a microcontroller, a digital signal processor, a field-programmable gate array, an application-specific integrated circuit, or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile or nonvolatile memory. For example, memory 330 includes random access memory (RAM), read only memory (ROM), a hard disk drive, or another type of memory (e.g., flash memory, magnetic memory, or optical memory). Memory 330 includes internal memory (e.g., RAM, ROM, or a hard disk drive) or removable memory (e.g., removable via a universal serial bus connection). Memory 330 is a non-transitory computer-readable medium, according to some implementations. Memory 330 stores information, instructions, or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input or sensed input. For example, input component 340 includes a touch screen, a keyboard, a keypad, a mouse, a button, a microphone, a switch, a sensor, a global positioning system sensor, an accelerometer, a gyroscope, or an actuator. Output component 350 enables device 300 to provide output, such as via a display, a speaker, or a light-emitting diode. Communication component 360 enables device 300 to communicate with other devices via a wired connection or a wireless connection. For example, communication component 360 includes a receiver, a transmitter, a transceiver, a modem, a network interface card, or an antenna.

Device 300 performs one or more operations or processes described herein. For example, a non-transitory computer-readable medium (e.g., memory 330) stores a set of instructions (e.g., one or more instructions or code) for execution by processor 320. Processor 320 executes the set of instructions to perform one or more operations or processes described herein. In some implementations, execution of the set of instructions, by one or more processors 320, causes the one or more processors 320 or the device 300 to perform one or more operations or processes described herein. In some implementations, hardwired circuitry is used instead of or in combination with the instructions to perform one or more operations or processes described herein. Additionally, or alternatively, processor 320 is configured to perform one or more operations or processes described herein. Thus, implementations described herein are not limited to any specific combination of hardware circuitry and software.

The number and arrangement of components shown in FIG. 3 are provided as an example. Device 300 includes additional components, fewer components, different components, or differently arranged components than those shown in FIG. 3. Additionally, or alternatively, a set of components (e.g., one or more components) of device 300 performs one or more functions described as being performed by another set of components of device 300, according to some implementations.

Figure 4:
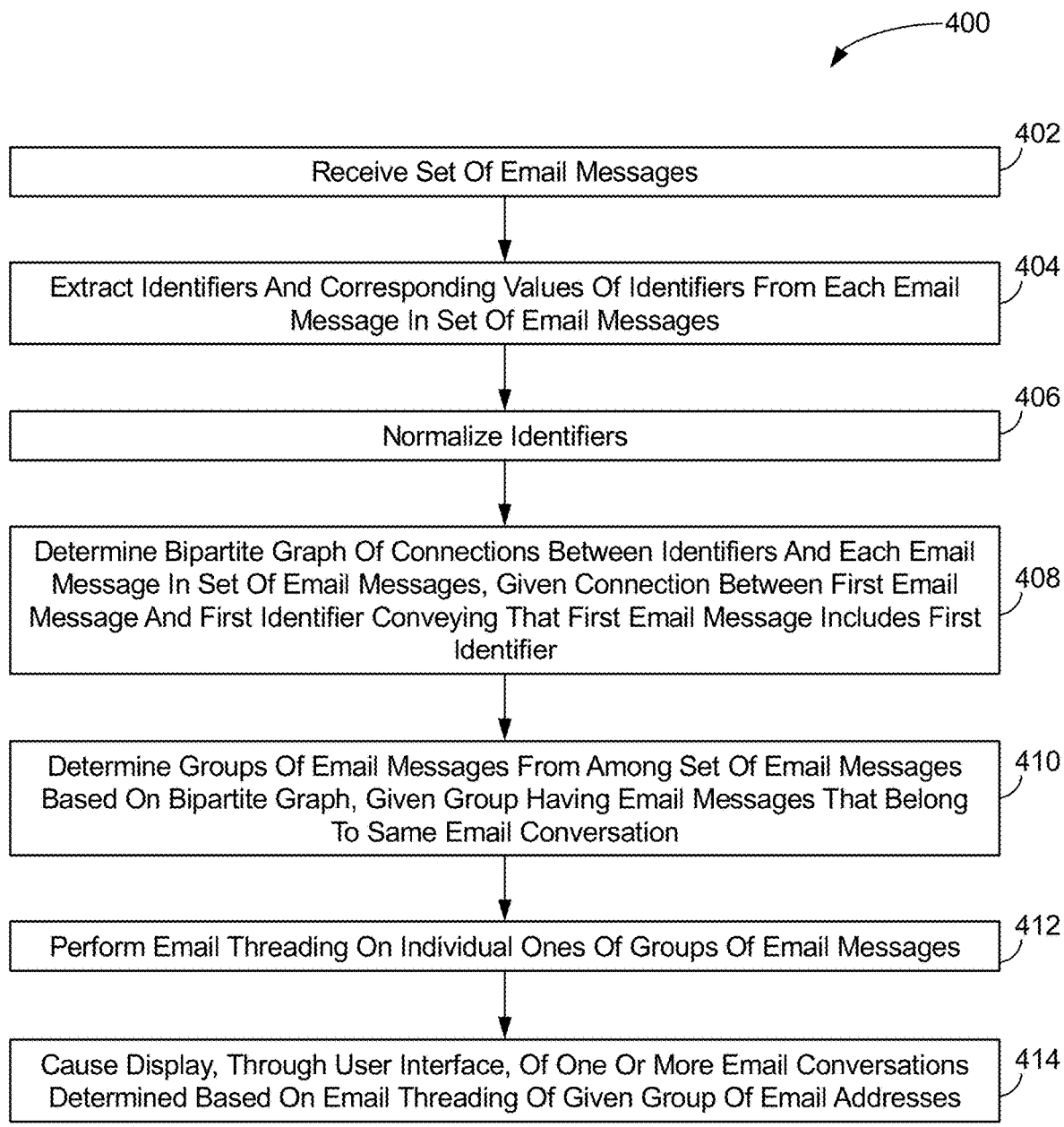
FIG. 4 is a flow chart of an example process for distributed email threading, in accordance with one or more implementations.

FIG. 4 is a flow chart of an example method 400 for distributed email threading, in accordance with one or more implementations. In some implementations, one or more process steps of FIG. 4 are performed by a device including one or more of computing system(s) 202, remote platform(s) 204, or other devices. In some implementations, one or more process steps of FIG. 4 are performed by another device or a group of devices separate from or including the device.

As shown at step 402, method 400 includes receiving a set of email messages. For example, according to some implementations, the device performs receiving a set of email messages, as described above.

As shown at step 404, method 400 includes extracting identifiers from each email message in the set of email messages. For example, according to some implementations, the device performs extracting identifiers from each email message in the set of email messages, as described above.

As shown at step 406, method 400 optionally includes normalizing the identifiers. Normalizing a first identifier and a second identifier having different descriptions includes determining whether the different descriptions refer to a same type of identifier. For example, according to some implementations, the device performs normalizing the identifiers. Normalizing a first identifier and a second identifier having different descriptions includes determining whether the different descriptions refer to a same type of identifier, as described above.

As shown at step 408, method 400 includes determining a graph of connections between the identifiers and each email message in the set of email messages, a given connection between a first email message and a first identifier conveying that the first email message includes the first identifier. For example, in some implementations, the device performs determining a graph of connections between the identifiers and each email message in the set of email messages, a given connection between a first email message and a first identifier conveying that the first email message includes the first identifier, as described above.

As shown at step 410, method 400 includes determining groups of email messages from among the set of email messages based on the graph, a given group having email messages that belong to a same email conversation. Each email in the given group shares at least one identifier with at least one other email message in the given group. For example, in some implementations, the device performs determining groups of email messages from among the set of email messages based on the graph, a given group having email messages that belong to a same email conversation. Each email in the given group shares at least one identifier with at least one other email message in the given group, as described above.

As shown at step 412, method 400 includes performing email threading on individual ones of the groups of email messages. For example, in some implementations, the device performs performing email threading on individual ones of the groups of email messages, as described above.

As shown at step 414, method 400 includes causing display, through a user interface, of one or more email conversations determined based on the email threading of a given group of email addresses. For example, in some implementations, the device performs causing display, through a user interface, of one or more email conversations determined based on the email threading of a given group of email addresses, as described above.

Method 400 includes additional implementations, such as any single implementation or any combination of implementations described herein or in connection with one or more other processes described elsewhere herein.

Although FIG. 4 shows example steps of method 400, in some implementations, method 400 includes additional, fewer, different, or differently arranged steps than those depicted in FIG. 4. Additionally, or alternatively, two or more of the steps of method 400 are performed in parallel.

The foregoing disclosure provides illustration and description but is not intended to be exhaustive or to limit the implementations to the precise form disclosed. Modifications and variations are made in light of the above disclosure or are acquired from practice of the implementations.

As used herein, the term "component" is intended to be broadly construed as hardware, firmware, or a combination of hardware and software.

Some implementations are described herein in connection with thresholds. As used herein, satisfying a threshold, depending on the context, refers to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems or methods described herein are implemented in different forms of hardware, firmware, or a combination of hardware and software, according to some implementations. The actual specialized control hardware or software code used to implement these systems or methods is not limiting of the implementations. Thus, the operation and behavior of the systems or methods are described herein without reference to specific software code—it being understood that software and hardware are designed to implement the systems or methods based on the description herein.

Even though particular combinations of features are recited in the claims or disclosed in the specification, these combinations are not intended to limit the disclosure of various implementations. In fact, many of these features are combined in ways not specifically recited in the claims or disclosed in the specification, according to some implementations. Although each dependent claim listed below directly depends on only one claim, the disclosure of various implementations includes each dependent claim in combination with every other claim in the claim set.

What is claimed is:

1. A method in a data processing system for distributed email threading, the method comprising:
   receiving, by a processor, a set of email messages;
   extracting, by the processor, identifiers from each email message in the set of email messages;
   determining, by the processor, a bipartite graph of connections between the identifiers and the email messages in the set of email messages, a given connection between a first email message and a first identifier conveying that the first email message includes the first identifier, wherein the identifiers and the email messages in the bipartite graph of connections form two disjoint sets, the identifiers within a first disjoint set do not connect directly with each other, and the email messages within a second disjoint set do not connect directly with each other;
   generating, based on the bipartite graph, one or more disjoint connected graphs, wherein each email message in a given disjointed connected graph shares at least one identifier with at least one other email message in the given disjointed connected graph;
   determining, by the processor, groups of the email messages from among the set of email messages based on the bipartite graph of connections, a given group having email messages that belong to a same email conversation, each group of the email messages corresponding to a disjoint connected graph; and
   performing, by the processor, email threading on two or more groups of email messages by processing in parallel the two or more groups of email messages independently of each other.

2. The method of claim 1, wherein the bipartite graph includes a first set of nodes of corresponding email messages from the set of email messages.

3. The method of claim 1, wherein the bipartite graph includes a second set of nodes corresponding to the identifiers from email messages in the set of email messages.

4. The method of claim 1, wherein performing the email threading comprises:
performing, by the processor, the email threading on the two or more groups of email messages, wherein the email threading includes identifying forward, reply, or reply-all email messages of an email conversation to identify message relationships, the message relationships including one or more of a common email thread, individuals involved in a given email conversation, or duplicate emails, wherein a given email thread starts with an original email as a beginning of the email conversation and includes subsequent email messages in the email conversation; and
causing display, through a user interface, of one or more email conversations determined based on the email threading of a given group of email addresses.

5. The method of claim 1, further comprising:
storing one or both of at least a portion of the email messages or at least a portion of the corresponding identifiers using a disjoint set data structure.

6. The method of claim 1, wherein the identifiers include one or more message header fields.

7. The method of claim 6, wherein the one or more message header fields include one or more of message recipient name or email address, message sender name or email address, message subject, carbon copy email address, blind carbon copy email address, message content type, message precedence, message identifier, in-reply-to message identifier, references message identifier, reply-to email address, or message archived-at link.

8. The method of claim 1, wherein determining groups of email messages from among the set of email messages based on the bipartite graph includes identifying the one or more disjoint connected graphs within the bipartite graph.

9. A computing system for distributed email threading, comprising:
a memory having executable instructions; and
one or more hardware processors configured to execute the instructions to:
receive a set of email messages;
extract identifiers from each email message in the set of email messages;
determine a bipartite graph of connections between the identifiers and the email messages in the set of email messages, a given connection between a first email message and a first identifier conveying that the first email message includes the first identifier, wherein the identifiers and the email messages in the bipartite graph form two disjoint sets, the identifiers within a first disjoint set do not connect directly with each other, and the email messages within a second disjoint set do not connect directly with each other;
generate, based on the bipartite graph, one or more disjoint connected graphs, wherein each email message in a given disjointed connected graph shares at least one identifier with at least one other email message in the given disjointed connected graph;
determine groups of the email messages from among the set of email messages based on the bipartite graph of connections, a given group having email messages that belong to a same email conversation, each group of the email messages corresponding to a disjoint connected graph; and
perform email threading on two or more individual group of the groups of email messages by processing in parallel the two or more of groups of email messages independently of each other.

10. The computing system of claim 9, wherein the bipartite graph includes a first set of nodes of corresponding email messages from the set of email messages.

11. The computing system of claim 9, wherein the bipartite graph includes a second set of nodes corresponding to the identifiers from email messages in the set of email messages.

12. The computing system of claim 9, wherein the one or more hardware processors are further configured to execute the instructions to:
perform email threading on individual group of the groups of email messages, wherein the email threading includes identifying forward, reply, or reply-all email messages of an email conversation to identify message relationships, the message relationships including one or more of a common email thread, individuals involved in a given email conversation, or duplicate emails, wherein a given email thread starts with an original email as a beginning of the email conversation and includes subsequent email messages in the email conversation; and
cause display, through a user interface, of one or more email conversations determined based on the email threading of a given group of email addresses.

13. The computing system of claim 9, wherein the one or more hardware processors are further configured to execute the instructions to:
store one or both of at least a portion of the email messages or at least a portion of the corresponding identifiers using a disjoint set data structure.

14. The computing system of claim 9, wherein the identifiers include one or more message header fields.

15. The computing system of claim 14, wherein the one or more message header fields include one or more of message recipient name or email address, message sender name or email address, message subject, carbon copy email address, blind carbon copy email address, message content type, message precedence, message identifier, in-reply-to message identifier, references message identifier, reply-to email address, or message archived-at link.

16. The computing system of claim 9, wherein determining groups of email messages from among the set of email messages based on the bipartite graph includes identifying the one or more disjoint connected graphs within the bipartite graph.

* * * * *